(12) United States Patent
Nakamura (10) Patent No.: US 7,376,336 B2
(45) Date of Patent: May 20, 2008

(54) RECORDING APPARATUS AND RECORDING CONTROL METHOD

(75) Inventor: Takeshi Nakamura, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 918 days.

(21) Appl. No.: 10/830,221

(22) Filed: Apr. 23, 2004

(65) Prior Publication Data

US 2004/0228609 A1 Nov. 18, 2004

(30) Foreign Application Priority Data

Apr. 25, 2003 (JP) ............................ P2003-121981

(51) Int. Cl.
*H04N 7/08* (2006.01)
*H04N 5/00* (2006.01)
(52) U.S. Cl. .................... 386/92; 386/83; 386/125; 725/59; 360/7
(58) Field of Classification Search ............... 348/262, 348/394.1, 407.1, 563–568; 386/46, 83, 386/92, 95, 125; 725/40–44, 59; 382/107, 382/123, 203, 206; 360/7; 358/538, 539; 709/231, 253
See application file for complete search history.

(56) References Cited

U.S. PATENT DOCUMENTS 5,996,023 A * 11/1999 Winter et al. ............... 709/253
6,160,544 A * 12/2000 Hayashi et al. ............. 715/716
7,013,477 B2 * 3/2006 Nakamura et al. ........... 725/32
2005/0025469 A1 * 2/2005 Geer et al. .................. 386/125

FOREIGN PATENT DOCUMENTS

EP 0 936 811 B1 5/2003
JP 09-035411 2/1997

* cited by examiner

*Primary Examiner*—Thai Q Tran
*Assistant Examiner*—Mishawn Dunn
(74) *Attorney, Agent, or Firm*—Drinker Biddle & Reath LLP (57) ABSTRACT

A recording apparatus is provided with a receiving device which simultaneously receives a plurality of broadcast video signals; a multiplexing device which obtains a plurality of broadcast video signals from the receiving device, putts each of the plurality of broadcast video signals into packets and converts the packets into time-division multiplexed data; and a control device which records the time-division multiplexed data in a memory apparatus in packet units using a ring buffer method and in the order of recording position, and forms chapter units in the memory apparatus from a specified group of packets for the same program when performing records.

11 Claims, 11 Drawing Sheets

| | RECORD AREA START ADDRESS | | 0x00-0000-0000 | | | START RECORD SEQUENCE NUMBER | | 0 |
|---|---|---|---|---|---|---|---|---|
| | RECORD AREA END ADDRESS | | 0xFF-F000-0000 | | | END RECORD SEQUENCE NUMBER | | 199 |
| PROGRAM NAME | PROGRAM ID | PROGRAM TIME | CHAPTER ID | RECORD SEQUENCE NUMBER | CHAPTER TIME | CHAPTER START ADDRESS | CHAPTER END ADDRESS | |
| PROGRAM A | 0 | 00h27m30s | 0 | 0 | 00h05m00s | 0x00-0000-0000 | 0x00-1000-0000 | |
| | | | 1 | 3 | 00h05m00s | 0x00-1005-0000 | 0x00-2300-0000 | |
| | | | 2 | 6 | 00h05m00s | 0x00-2600-0000 | 0x00-3A00-0000 | |
| | | | ... | ... | ... | ... | ... | |
| | | | 5 | 19 | 00h02m30s | xxxx | xxxx | |
| PROGRAM B | 1 | 00h23m25s | 0 | 1 | 00h05m00s | 0x00-0003-0000 | 0x00-1800-0000 | |
| | | | 1 | 4 | 00h05m00s | 0x00-1F00-0000 | 0x00-2D0-0000 | |
| | | | ... | ... | ... | ... | ... | |
| | | | 4 | 15 | 00h05m00s | xxxx | xxxx | |
| PROGRAM C | 2 | 00h56m42s | 0 | 2 | 00h05m00s | 0x00-0C00-0000 | 0x00-1D00-0000 | |
| | | | 1 | 6 | 00h05m00s | 0x00-2000-0000 | 0x00-3100-0000 | |
| | | | ... | ... | ... | ... | ... | |
| | | | 11 | 29 | 00h01m42s | xxxx | xxxx | |
| | | | ... | ... | ... | ... | ... | |
| PROGRAM X | 25 | 00h04m00s | 0 | 199 | 00h04m00s | xxxx | 0xFF-F000-0000 | |

FIG. 7

(DELETING PROGRAM A0, AND STARTING RECORDING OF PROGRAM Y)

| | RECORD AREA START ADDRESS | 0x00-0003-0000 | | | | START RECORD SEQUENCE NUMBER | 0 |
|---|---|---|---|---|---|---|---|
| | RECORD AREA END ADDRESS | 0x00-0001-0000 | | | | END RECORD SEQUENCE NUMBER | 200 |
| PROGRAM NAME | PROGRAM ID | PROGRAM TIME | CHAPTER ID | RECORD SEQUENCE NUMBER | CHAPTER TIME | CHAPTER START ADDRESS | CHAPTER END ADDRESS |
| PROGRAM A | 0 | 00h27m30s | 1 | 3 | 00h05m00s | 0x00-1005-0000 | 0x00-2300-0000 |
| | | | 2 | 6 | 00h05m00s | 0x00-2600-0000 | 0x00-3A00-0000 |
| | | | 5 | 19 | 00h02m30s | xxxx | xxxx |
| PROGRAM B | 1 | 00h23m25s | 0 | 1 | 00h05m00s | 0x00-0003-0000 | 0x00-1800-0000 |
| | | | 1 | 4 | 00h05m00s | 0x00-1F00-0000 | 0x00-2D0-0000 |
| | | | 4 | 15 | 00h05m00s | xxxx | xxxx |
| PROGRAM C | 2 | 00h56m42s | 0 | 2 | 00h05m00s | 0x00-0C00-0000 | 0x00-1D00-0000 |
| | | | 1 | 6 | 00h05m00s | 0x00-2000-0000 | 0x00-3100-0000 |
| | | | 11 | 29 | 00h01m42s | xxxx | xxxx |
| PROGRAM X | 25 | 00h04m00s | 0 | 199 | 00h04m00s | xxxx | 0xFF-F000-0000 |
| PROGRAM Y | 26 | 00h02m51s | 0 | 200 | 00h02m51s | 0xFF-F000-0000 | 0x00-0001-0000 |

(RECORDING CONTINUES)

FIG. 8

(DELETING PROGRAM B0, AND RECORDING OF PROGRAM Y CONTINUES)

| PROGRAM NAME | RECORD AREA START ADDRESS | | | 0x00-000C-0000 | | | START RECORD SEQUENCE NUMBER | 2 |
|---|---|---|---|---|---|---|---|---|
| | RECORD AREA END ADDRESS | | | 0x00-0006-0000 | | | END RECORD SEQUENCE NUMBER | 201 |
| | PROGRAM ID | PROGRAM TIME | CHAPTER ID | RECORD SEQUENCE NUMBER | CHAPTER TIME | CHAPTER START ADDRESS | | CHAPTER END ADDRESS |
| PROGRAM A | 0 | 00h27m30s | 1 | 3 | 00h05m00s | 0x00-1005-0000 | | 0x00-2300-0000 |
| | | | 2 | 6 | 00h05m00s | 0x00-2600-0000 | | 0x00-3A00-0000 |
| | | | ... | | | | | |
| | | | 5 | 19 | 00h02m30s | xxxx | | xxxx |
| PROGRAM B | 1 | 00h23m25s | 1 | 4 | 00h05m00s | 0x00-1F00-0000 | | 0x00-2D0-0000 |
| | | | ... | | | | | |
| | | | 4 | 15 | 00h05m00s | xxxx | | xxxx |
| PROGRAM C | 2 | 00h56m42s | 0 | 2 | 00h05m00s | 0x00-0C00-0000 | | 0x00-1D00-0000 |
| | | | 1 | 6 | 00h05m00s | 0x00-2000-0000 | | 0x00-3100-0000 |
| | | | ... | | | | | |
| | | | 11 | 29 | 00h01m42s | xxxx | | xxxx |
| PROGRAM X | 25 | 00h04m00s | 0 | 199 | 00h04m00s | xxxx | | 0xFF-F000-0000 |
| PROGRAM Y | 26 | 00h07m11s | 0 | 200 | 00h05m00s | 0xFF-F000-0000 | | 0x00-0001-0000 |
| | | | 1 | 201 | 00h02m11s | 0x00-0001-0000 | | 0x00-0006-0000 (CHAPTER DIVISION IS PERFORMED AND RECORDING CONTINUES) |

FIG. 9

(DELETING PROGRAM C0, AND RECORDING OF PROGRAM Y ENDS)

| | RECORD AREA START ADDRESS | | 0x00-1005-0000 | | | START RECORD SEQUENCE NUMBER | | 3 |
|---|---|---|---|---|---|---|---|---|
| | RECORD AREA END ADDRESS | | 0x00-F000-0000 | | | END RECORD SEQUENCE NUMBER | | 201 |
| PROGRAM NAME | PROGRAM ID | PROGRAM TIME | CHAPTER ID | RECORD SEQUENCE NUMBER | CHAPTER TIME | CHAPTER START ADDRESS | CHAPTER END ADDRESS |
| PROGRAM A | 0 | 00h27m30s | 1 | 3 | 00h05m00s | 0x00-1005-0000 | 0x00-2300-0000 |
| | | | 2 | 6 | 00h05m00s | 0x00-2600-0000 | 0x00-3A00-0000 |
| | | | ... | ... | ... | ... | ... |
| | | | 5 | 19 | 00h02m30s | xxxx | xxxx |
| PROGRAM B | 1 | 00h23m25s | 1 | 4 | 00h05m00s | 0x00-1F00-0000 | 0x00-2D0-0000 |
| | | | ... | ... | ... | ... | ... |
| | | | 4 | 15 | 00h05m00s | xxxx | xxxx |
| PROGRAM C | 2 | 00h56m42s | 1 | 6 | 00h05m00s | 0x00-2000-0000 | 0x00-3100-0000 |
| | | | ... | ... | ... | ... | ... |
| | | | 11 | 29 | 00h01m42s | xxxx | xxxx |
| | | | ... | ... | ... | ... | ... |
| PROGRAM X | 25 | 00h04m00s | 0 | 199 | 00h04m00s | xxxx | 0xFF-F000-0000 |
| PROGRAM Y | 26 | 00h09m20s | 0 | 200 | 00h05m00s | 0xFF-F000-0000 | 0x00-0001-0000 |
| | | | 1 | 201 | 00h04m20s | 0x00-0001-0000 | 0x00-F000-0000 (RECORDING ENDS) |

| PROGRAM ID | STREAM ID | SUB TYPE ID | CHAPTER ID | STREAM START ADDRESS | STREAM END ADDRESS |
|---|---|---|---|---|---|
| 0 (PROGRAM A) | 0xE0 (VIDEO1) | 0x00 | 0 | 0x00-0000-0000 | 0x00-1000-0000 |
| | | | 1 | 0x00-1005-0000 | 0x00-2300-0000 |
| | | | 2 | 0x00-2600-0000 | 0x00-3A00-0000 |
| | | | ... | | |
| | 0xC0 (AUDIO1) | 0x00 | 0 | 0x00-0000-8000 | 0x00-0FFC-0000 |
| | | | 1 | 0x00-1005-8000 | 0x00-22FC-0000 |
| | | | 2 | 0x00-2600-8000 | 0x00-30FC-0000 |
| | | | ... | | |
| 1 (PROGRAM B) | 0xE0 (VIDEO1) | 0x00 | 0 | 0x00-0003-0000 | 0x00-1800-0000 |
| | | | 1 | xxxx | xxxx |
| | | | ... | | |
| | 0xC0 (AUDIO1) | 0x10 (MAIN AUDIO) | 0 | xxxx | xxxx |
| | | | 1 | xxxx | xxxx |
| | | | ... | | |
| | 0xC1 (AUDIO2) | 0x11 (SUB AUDIO) | 0 | xxxx | xxxx |
| | | | 1 | xxxx | xxxx |
| | | | ... | | |
| 2 (PROGRAM C) | 0xE0 (VIDEO1) | 0x00 | 0 | 0x00-0C00-0000 | 0x00-1D00-0000 |
| | | | 1 | xxxx | xxxx |
| | | | ... | | |
| | 0xC0 (AUDIO1) | 0x21 (JAPANESE) | 0 | xxxx | xxxx |
| | | | 1 | xxxx | xxxx |
| | | | ... | | |
| | 0xC1 (AUDIO2) | 0x20 (ENGLISH) | 0 | xxxx | xxxx |
| | | | 1 | xxxx | xxxx |
| | | | ... | | |
| | 0xBD (DATA) | 0x00 | 0 | xxxx | xxxx |
| | | | 1 | xxxx | xxxx |
| | | | ... | | |
| ... | | | | | |

RECORDING APPARATUS AND RECORDING CONTROL METHOD

BACKGROUND OF THE INVENTION

1. Field of the Invention

This invention relates to a recording apparatus that records a broadcast-video signal of a broadcast program, a method for controlling it, and an information recording medium for recording control.

2. Related Art

As a prior recording apparatus, there is a recording apparatus as disclosed reference (Japanese Patent Laid-Open No. H9-35411) that compresses the video signal and audio signal of a broadcast program as compressed data and records that data on the recording apparatus continuously over a specified period of time for a television channel pre-set by the user without having a recording instruction from the user for each program. With this recording apparatus, when reproducing the data, the compressed data is read from the recording apparatus and expanded, making it possible to continuously or selectively view various broadcast programs over the specified time.

Also, in Reference (EP 0936811B1) a recording apparatus is disclosed that is provided with two kinds of storage units; for example, a first storage unit is a hard disc unit that stores broadcast program data in FIFO (First In First Out) format, and a second storage unit is an optical-disc unit that stores specified image data after that specified image data is detected from the image data stored in the first storage unit are known.

In the prior recording apparatuses there was a technique of constantly recording broadcast programs, and performing time-division multiplexing of the video signals and audio signals of a plurality of channels to record them in one memory apparatus.

However, since the data is recorded in a memory apparatus such as the hard disc in the recording apparatus using the ring-buffer method, when recording is performed until the memory capacity of that memory apparatus becomes full, the first recoded programs are deleted and new programs are recoded in that deleted space. Therefore, it is desirable that recording is efficiently performed by the recording apparatus even after the storage apparatus reaches its capacity.

SUMMARY OF THE INVENTION

Taking the inconvenience described above as an example, the object of this invention is to provide a recording apparatus and a control method for it desirable that recording is efficiently performed by the recording apparatus even after the storage apparatus reaches its capacity.

The above object of the present invention can be achieved by a recording apparatus of the present invention. The recording apparatus is provided with a receiving device which simultaneously receives a plurality of broadcast video signals; a multiplexing device which obtains a plurality of broadcast video signals from the receiving device, putts each of the plurality of broadcast video signals into packets and converts the packets into time-division multiplexed data; and a control device which records the time-division multiplexed data in a memory apparatus in packet units using a ring buffer method and in the order of recording position, and forms chapter units in the memory apparatus from a specified group of packets for the same program when performing records, wherein the control device which records a new packet to be recorded over an old packet in order of recording position when the packet length of the packet to be recorded next is greater than the data length of the recordable area from the recording ending position of the newest packet in the recording order to the recording starting position of the oldest packet in the recording order, and takes the recordable area to be the recorded area of a chapter of packets that is equal to that old chapter of packets.

According to the present invention, when using a disc drive such as a hard disc drive as the memory apparatus, it is possible to reduce the number of times head seeking is performed. In other words, recording to the hard disc drive is performed using a ring buffer method, and the recorded program is recorded in the recorded-program database, so even when a packet is recorded over another, it is performed in address order (order of recording position). By recording over other packets, the packets of the oldest programs are deleted. Therefore, it is not necessary to perform head seeking and delete the recorded area of the oldest program, and new packets are recorded over other packets in address order so it is possible to do away with most of the number of times that head seeking is performed. As a result, when recording over older packets, efficient recording in address order is possible.

In one aspect of the present invention can be achieved by the recording apparatus of the present invention. The recording apparatus of the present invention is, wherein the control device records packets as a new chapter in the memory apparatus when the time length of the chapter of the packets to he recorded next is greater than the maximum chapter time.

According to the present invention, the chapter time can be set to an arbitrary time. Setting the chapter time to a short amount of time is advantageous in that the amount of wasted empty recording space is reduced, and the unit size for deleting streams is shortened. On the other hand, setting the maximum chapter time to a long amount of time is advantageous in that the number of times the deletion process must be performed is reduced. Dividing chapters can be performed by using changes in video scenes, or content analysis results for the program as dividing units By doing this, a program can be divided into chapters using meaningful units, and thus suitable searching or deleting of programs becomes possible, as well as it is user friendly. It is also possible to perform deletion in program units without dividing up chapters.

In another aspect of the present invention can be achieved by the recording apparatus of the present invention. The recording apparatus of the present invention is, wherein the control device assigns a recording sequence number to the chapters that indicates the order of the chapters recorded in the memory apparatus regardless of the program, and saves the relationship between the chapters and the recording sequence numbers for each program in a database unit; and when the packet length of the packet to be recorded next is greater than the data length of the recordable area between the recording ending position and the recording starting position, it takes the chapter corresponding to the current starting recording sequence number to be the oldest chapter of packets, and deletes the data of that chapter from the database unit and updates the starting recording sequence number of the database unit by increasing it by '1'.

According to the present invention, the stream information (video, audio, data) of the program recorded in the memory apparatus is controlled by the stream database, and by using the stream database, it is possible to know the contents of a program that is recorded in the memory apparatus without having to read and search recorded information from the memory apparatus. Also, it is possible to search for a desired program and to immediately access the position where that desired program is recorded.

In further aspect of the present invention can be achieved by the recording apparatus of the present invention. The recording apparatus of the present invention is, wherein the control device deletes data for one program from the database unit when data for all of the chapters of one program are deleted by deleting the data for the chapter from the database unit.

According to the present invention, it is desirable that recording is efficiently performed by the recording apparatus even after the storage apparatus reaches its capacity. The stream information of the program recorded in the memory apparatus is controlled by the stream database, and by using the stream database, it is possible to know the contents of a program that is recorded in the memory apparatus without having to read and search recorded information from the memory apparatus. Also, it is possible to search for a desired program and to immediately access the position where that desired program is recorded.

In further aspect of the present invention can be achieved by the recording apparatus of the present invention. The recording apparatus of the present invention is, wherein the control device creates data for a new program in the database unit when recording packets of a new program, and creates data for chapters of a new program in the database unit.

According to the present invention, it is desirable that recording is efficiently performed by the recording apparatus even after the storage apparatus reaches its capacity.

In further aspect of the present invention can be achieved by the recording apparatus of the present invention. The recording apparatus of the present invention is, wherein the control device stores the recording area starting address, which indicates the recording starting position, and the recording area ending address, which indicates the recording ending position, in the database unit, and updates the recording area ending address each time a packet is recorded, and updates the recording area starting address each time a packet is recorded over.

According to the present invention, it is desirable that recording is efficiently performed by the recording apparatus even after the storage apparatus reaches its capacity The stream information of the program recorded in the memory apparatus is controlled by the stream database, and by using the stream database, it is possible to know the contents of a program that is recorded in the memory apparatus without having to read and search recorded information from the memory apparatus. Also, it is possible to search for a desired program and to immediately access the position where that desired program is recorded.

The above object of the present invention can be achieved by a control method of the present invention. The control method for a recording apparatus which includes a receiving device capable of simultaneously receiving a plurality of broadcast video signals, the control method is provided with an obtaining process of obtaining a plurality of broadcast video signals from the receiving device, putting each of the plurality of broadcast video signals into packets and converting the packets into time-division multiplexed data; a first recording process of recording the time-division multiplexed data in a memory apparatus in packet units using a ring buffer method and in the order of recording position, and forming chapter units in the memory apparatus from a specified group of packets for the same program when performing records; and a second recording process of recording a new packet to be recorded over an old packet in the order of recording position when the packet length of the packet to be recorded next is greater than the data length of the recordable area from the recording ending position of the newest packet in the recording order to the recording starting position of the oldest packet in the recording order, and takes the recordable area to be the recorded area of a chapter of packets that is equal to that old chapter of packets.

According to the present invention, when using a disc drive such as a hard disc drive as the memory apparatus, it is possible to reduce the number of times head seeking is performed. In other words, recording to the hard disc drive is performed using a ring buffer method, and the recorded program is recorded in the recorded-program database, so even when a packet is recorded over another, it is performed in address order (order of recording position). By recording over other packets, the packets of the oldest programs are deleted. Therefore, it is not necessary to perform head seeking and delete the recorded area of the oldest program, and new packets are recorded over other packets in address order so it is possible to do away with most of the number of times that head seeking is performed. As a result, when recording over older packets, efficient recording in address order is possible.

The above object of the present invention can be achieved by an information recording program of the present invention. The information recording program is embodied in a recording medium which can be read by a computer in a recording apparatus. The program makes the computer function as: a receiving device which simultaneously receives a plurality of broadcast video signals; a multiplexing device which obtains a plurality of broadcast video signals from the receiving device, putts each of the plurality of broadcast video signals into packets and converts the packets into time-division multiplexed data; and a control device which records the time-division multiplexed data in a memory apparatus in packet units using a ring bluffer method and in the order of recording position, and forms chapter units in the memory apparatus from a specified group of packets for the same program when performing records, wherein the control device which records a new packet to be recorded over an old packet in order of recording position when the packet length of the packet to be recorded next is greater than the data length of the recordable area from the recording ending position of the newest packet in the recording order to the recording starting position of the oldest packet in the recording order, and takes the recordable area to be the recorded area of a chapter of packets that is equal to that old chapter of packets.

According to the present invention, when using a disc drive such as a hard disc drive as the memory apparatus, it is possible to reduce the number of times head seeking is performed. In other words, recording to the hard disc drive is performed using a ring buffer method, and the recorded program is recorded in the recorded-program database, so even when a packet is recorded over another, it is performed in address order (order of recording position). By recording over other packets, the packets of the oldest programs are deleted Therefore, it is not necessary to perform head seeking and delete the recorded area of the oldest program, and new packets are recorded over other packets in address order so it is possible to do away with most of the number of times that head seeking is performed. As a result, when recording over older packets, efficient recording in address order is possible.

DESCRIPTION OF THE PREFERRED EMBODIMENTS

The preferred embodiments of the invention are explained in detail with reference to the drawings.

Figure 1:
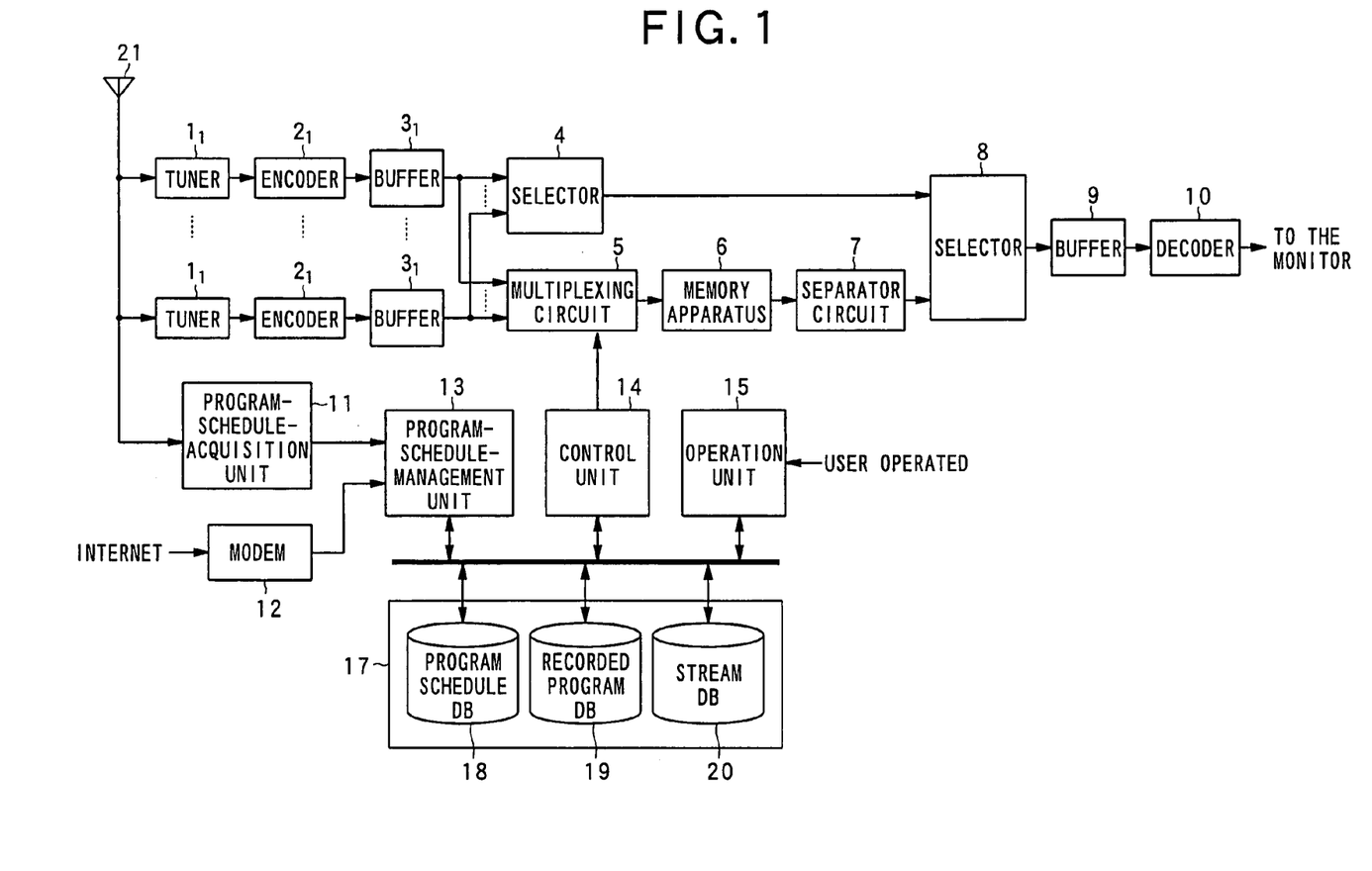
FIG. 1 is a block diagram showing the construction of a recording apparatus to which the invention is applied.

FIG. 1 shows a recording apparatus to which the invention is applied. This recording apparatus is provided with: n number of tuners 1(1) to 1(n) (in this embodiment, n is assumed to be plural, or in other words, two or more, however, it does not exclude the possibility of one); n number of encoders 2(1) to 2(n), n number of buffers 3(1) to 3(n), a selector 4, multiplexing circuit 5, memory apparatus 7, separator circuit 7, selector 8, buffer 9, decoder 10, program-schedule-acquisition unit 11, modem 12, program-schedule-management unit 13, control unit 14, operation unit 15, bus 16 and database unit 17.

The n groups of tuners 1(1) to 1(n), encoders 2(1) to 2(n) and buffers 3(1) to 3(n) are connected in that order for each group each of the tuners 1(1) to 1(n) receives arbitrary television broadcast waves by way of an antenna 21 and demodulates that received signal and outputs an analog video signal and audio signal (in other words, a broadcast video signal). In this embodiment, the tuners 1(1) to 1(n) are all the same, for example, there can be one for a ground-wave broadcast, a BS broadcast and a CS broadcast or the like, and furthermore, instead of one for each kind of broadcast, they can be for a plurality of ground-wave broadcasts. The encoders 2(1) to 2(n) convert the video signals and audio signals that are output from the tuners 1(1) to 1(n) into compressed data in MPEG format (stream data). The buffers 3(1) to 3(n) adjust the timing at which the compressed data is supplied to the multiplexing circuit 5. The selector 4 selectively outputs the compressed data from one of the buffers 3(1) to 3(n) to the selector 8. Selection by that selector 4 is performed according to an instruction from the control unit 14. When the compressed data is supplied from the selector 4 to just the selector 8 and is not supplied to the multiplexing circuit 5, the buffers 3(1) to 3(n) are in a through state, and do not adjust the timing for supplying the compressed data.

After the multiplexing circuit 5 puts the output compressed data that is supplied from the buffers 3(1) to 3(n) into packets, it performs time-division multiplexing and supplies that time-division multiplexed data to the memory apparatus 6 in packet units. A packet can correspond to the amount of data for one frame of video, for example, but this is not necessarily set.

The memory apparatus 6, for example, is a recording medium that can be written over and can be accessed randomly such as a hard disc drive, and it records the time-division multiplexed data supplied from the multiplexing circuit 5 according to a write instruction from the control unit 14 to an internal fixed disc in packet units using a ring buffer method. In other words, recording to each of the addresses on the fixed disc is performed in a pre-determined address order from the starting address to the ending address, and when recording is completed up to the ending address, recording returns to the starting address and writes over the data, and this process is repeated. The multiplexed data is recorded in the memory apparatus 6 in packet units, and forms one chapter (described later) from a group of packets of the same program that were recorded in sequence. Recording of the multiplexed data will be explained in detail later.

Also, the memory apparatus 6 reads multiplexed data that includes desired compressed data according to a read instruction from the control unit 14.

According to an instruction from the control unit 14, the separator circuit 7 separates and extracts packets of indicated program from the multiplexed data that was read from the memory apparatus 6, and removes a specific part (such as the header information) from the packet that, and output it, or compressed data to the selector 8. The selector 8, selectively outputs either the compressed data relayed and output from the selector 4 or the compressed data output from the separator circuit 7. The selection by the selector 8 is performed according to an instruction from the control unit 14. The decoder 10 is connected to the output from the selector 8 by way of the buffer 9. The buffer 9 adjusts the timing at which the compressed data output from the selector 8 is supplied to the decoder 10.

The decoder 10 expands the compressed data that is output from the buffer 9, and restores the video signal and audio signal. The restored video signal and audio signal are supplied to the monitor (not shown in the figure).

The program-schedule-acquisition unit 11 extracts program information such as EGP that is contained in the received signal, or in other words, extracts program information that is multiplexed with the broadcast wave, and outputs that extracted program information to the program-schedule-management unit 13 as data. The modem 12 can connect to the Internet, and performs communication with a specified server computer (not shown in the figures) over the Internet, and acquires program information and outputs that program information to the program-schedule-management unit 13 as data. The specified server computer is a computer that sends the most update program schedules for broadcast programs for each television broadcast station. The number of computers for sending this kind of program information is not limited to one computer.

The program-schedule-management unit 13, control unit 14, operation unit 15 and database unit 17 are connected to the bus 16.

The database unit 17 is composed of a program-schedule database (DB) 18, recorded-program database 19 and stream database 20.

The program-schedule-management unit 13 manages the program-schedule database 18 in the database unit 17 based on program information such as EPG (Electronic Program Guide) that was obtained by the program-schedule-acquisition unit 10 and modem 11. The control unit 14 forms a recorded-program database 19 in the database unit 17 for programs included in the multiplexed data that are recorded in the memory apparatus 6. Also, the control unit 14 forms a stream database 20 in the database unit 17 for programs recorded as multiplexed data in the memory apparatus 6.

The program name of each program, the broadcast station, the broadcast time, genre, position, actors (character names/songs), comments and the like are saved in the program-schedule database 18. The recording schedule is also saved. The recording schedule is data that indicates programs that were preset for recording and programs that match the user's preferences.

Programs written as multiplexed data in the memory apparatus 6, which means that information about recorded programs is stored in the recorded program database 19. More specifically, that information includes the program name, program ID, program time (time length of the program), chapter ID, recording sequence number, chapter time (time length of the chapter), chapter starting address and chapter ending address. Also, the starting address and ending address of the recording area in the memory apparatus 6 and the starting and ending recording sequence numbers are saved.

The program ID is a unique number code that identifies a program, and is assigned in order starting from '0'. A chapter is a unit for dividing a recorded program into preset lengths of time (for example, 5 minutes). This chapter is used as a search unit for searching recorded programs in the memory apparatus 6, or as a unit when deleting saved data from the memory apparatus 6. The chapter ID is a number that is assigned to chapters in order starting from '0'. The chapter time is the reproduction time of the chapter. The total of all of the chapter times for one program is the reproduction time for that one program. A chapter start address and chapter end address are recorded for each chapter.

Recording sequence numbers are given to the programs recorded in the memory apparatus 6 in chapter units and in the order of recording, and are numbers that span over a plurality of programs. The order from the smallest recording sequence number for one program is the number order of the chapter ID numbers. The earliest sequence number is the starting recording sequence number and the most recent sequence number is the ending recording sequence number. The chapter starting address that corresponds to the starting recording sequence number is the starting address of the recording area, and the chapter ending address that corresponds to the ending recording sequence number is the ending address of the recording area.

Maximum values are set for the program ID and recording sequence number. These maximum values correspond to the maximum number of programs and the maximum number of chapters that can be recorded in the memory apparatus 6. The program IDs and recording sequence numbers are assigned in order starting from '0', and when they exceed the maximum values they return to '0'. As explained above, programs and chapters are deleted from the memory apparatus 6 in order from the oldest, so since the program IDs and recording-sequence numbers are deleted from the recorded-program database 19 in order starting from the oldest, a plurality of programs having the same program ID or the same recording sequence numbers do not exist in the recorded-program database 19.

The program ID for each program, stream ID, sub-type ID, chapter ID, stream starting address and stream ending address are saved in the stream database 20. A stream ID is assigned to each stream (video, audio or data) of a program, and each has a different value. When a plurality of stream IDs are assigned in the same program, they each have a different value. Sub-type IDs are assigned when further classifying stream information to which a stream ID has been assigned. For example, they are used for classification such as the camera angle, main audio/sub audio, language, data type and the like. The stream start address and stream end address are recorded in chapter ID units for each stream information.

The operation unit 15 is provided with a keyboard and supplies operation data to the control unit 14 according to key operations by the user.

Figure 2:
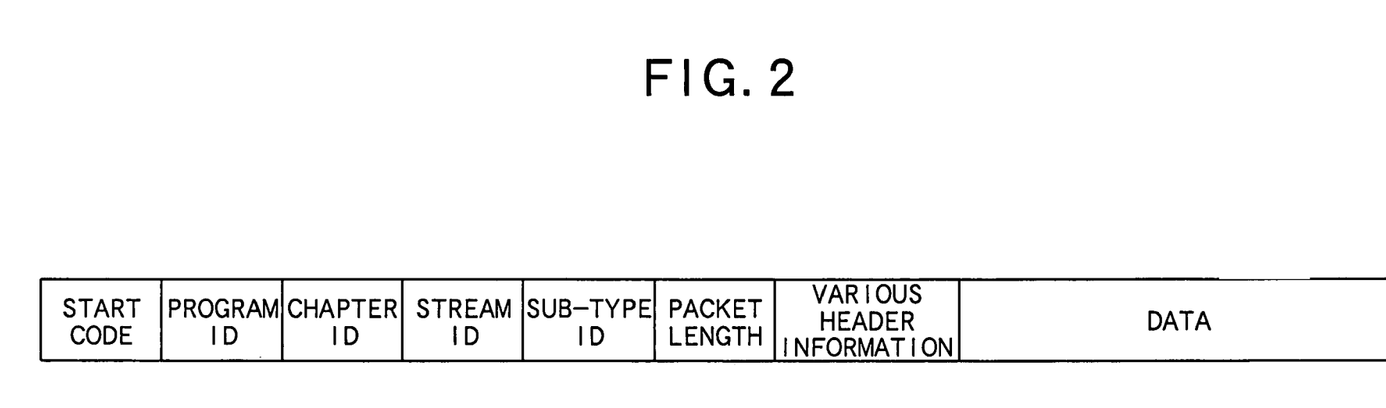
FIG. 2 is a drawing showing the structure of a packet.

The structure of the packets created by the multiplexing circuit 5 is as shown in FIG. 2 for example. More specifically, in order from the start of the packet is the start code, program ID, chapter ID, stream ID, packet length, various header information, and the main data. The number of bytes of the packet to follow is given in the packet length. From the packet information it is possible to skip over the packets that are not necessary and move on to read packets that are necessary.

Figure 3:
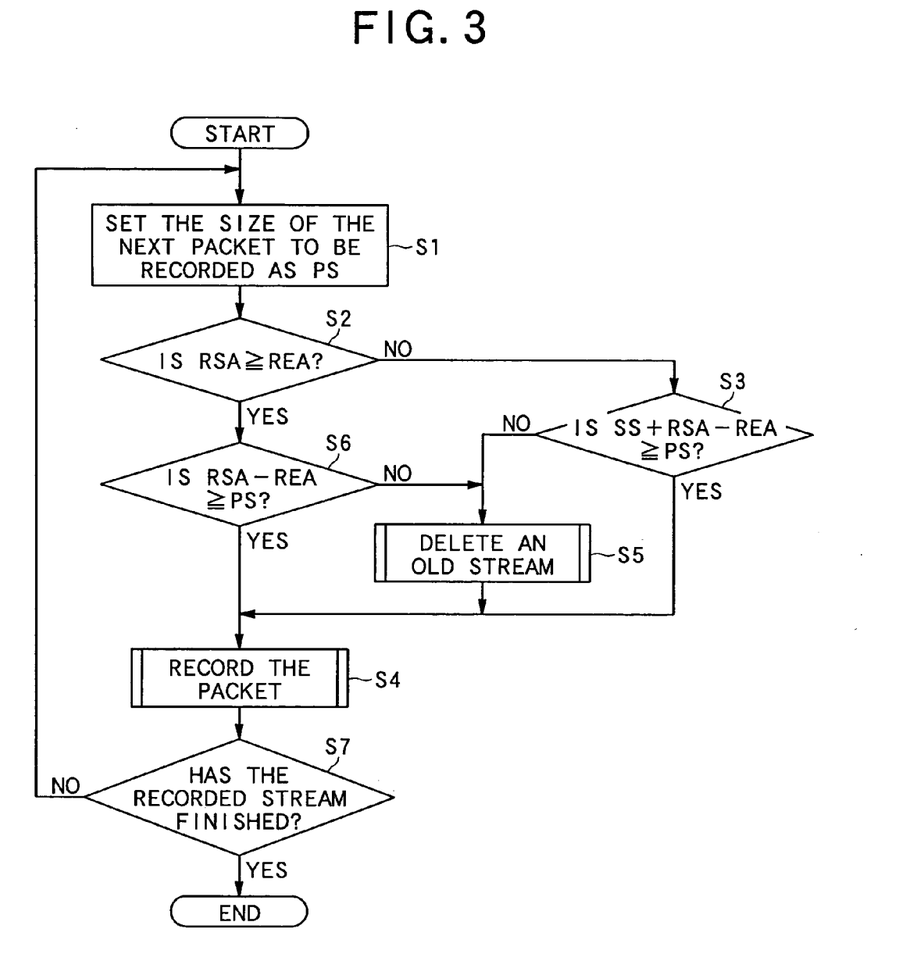
FIG. 3 is flowchart showing the main routine.

The control unit 14 repeatedly executes the main routine. When executing the main routine, as shown in FIG. 3, the control unit 14 first acquires the size of the packet to be recorded next in the memory apparatus 6 from the multiplexing circuit 5 as PS (step S1), and determines whether or not the recording area starting address RSA is greater than the recording area ending address REA (step S2). The control unit 14 reads the recording area starting address RSA and the recording area ending address REA from the recorded program database 19 in the database unit 17. When RSA<RCA, the control unit 14 determines whether or not the free recording area of the memory apparatus 6 (SS+RSA−REA) is greater than the packet size PS (step S3). SS is the memory capacity of the memory apparatus 6 and is known in advance. When (SS+RSA−REA)≧PS, then there is enough area for the packet size PS and the packet is recorded (step S4). On the other hand, when (SS+RSA−REA)<PS, the current empty recording area of the memory apparatus 6 is not enough for the packet size PS, so an old stream is deleted (step S5).

In step S2, when it is determined that RSA≧PEA, the control unit 14 determines whether or not the empty recording area of the memory apparatus 6 RSA−REA is greater than the packet size PS (step S6). When RSA−REA≧PS, there is enough area for the packet size PS, so the control unit 14 moves to step S4 and records the packet. When RSA−REA<PS, the current empty area of the memory apparatus 6 is not enough area for the packet size PS, so the control unit S5 moves to step S5 and deletes an old stream.

In step S5, after an old stream is deleted, the control unit 14 moves to step S4.

When the packet was recorded in step S4, the control unit 14 determines whether or not the stream to be recorded, or in other words, whether or not all of the packets of multiplexed data of the program have been recorded (step S7). When not all of the packets have been recorded, the control unit 14 returns to step S1 and repeats the operation described above Deletion of an old stream in step S5 will be explained in detail using FIG. 4. First, the control unit 14 reads and obtains the current starting recording sequence number SN from the recorded-program database 19 in the database unit 17, and then deletes the data of the chapter corresponding to that current recording sequence number SN from the recorded-program database 19 and stream database 20 in the database unit 17 (step S11). Also, in order to update the starting recording sequence number SN, the control unit 14 increases the number by just 1 (step S12), and then determines whether or not the starting recording sequence number SN is greater than the maximum value Nmax for recording sequence numbers (step S13). When SN<Nmax, the starting recording sequence number SN that was calculated in step S12 is maintained, however when SN≧Nmax, the starting recording sequence number is set to '0' (step S14). The result of step S13 or step S14 is re-written as the starting recording sequence number for the recorded-program database 19 in the database unit 17. In step S13, when it was determined that SN<Nmax, or after step S14 is executed, the control unit 14 moves to and executes step S15.

Figure 4:
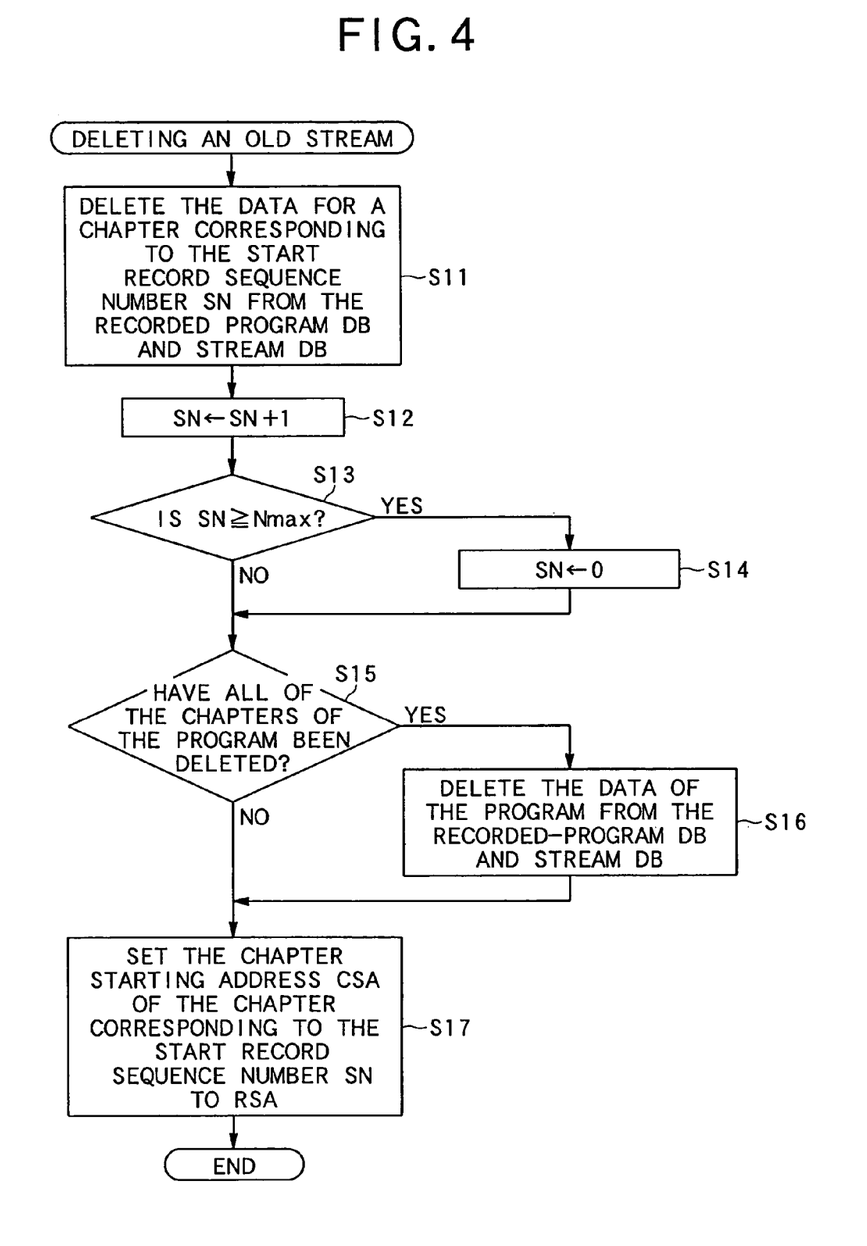
FIG. 4 is a flowchart showing the deletion process of an old stream.

The control unit 14 determines according to the update of the starting recording sequence number SN whether or not all of the chapters in one program have been deleted (step S15). When all of the chapters in one program have been deleted, the control unit 14 deletes the data for that program from the recorded-program database 19 and stream database 20 in the database unit 17 (step S16). When not all of the chapters in one program have been deleted, or when step S11 has been executed, the control unit 14 moves to and executes step S17.

The control unit 14 sets the starting address of the chapter that corresponds to the updated starting recording sequence number SN as the recording area starting address RSA (step S17). The result of step S17 is rewritten as the recording area starting address of the recorded-program database 19 in the database unit 17.

Figure 5:
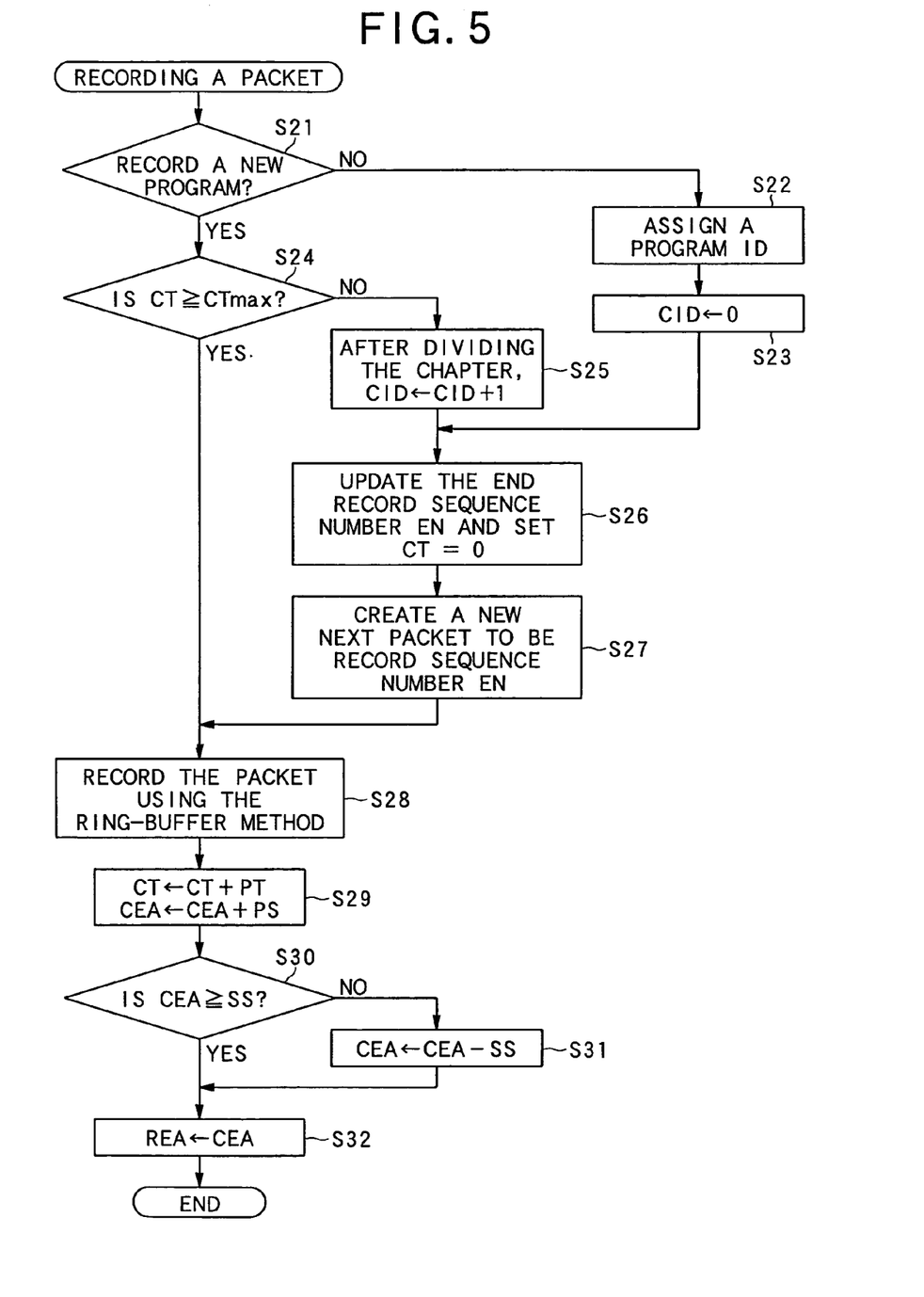
FIG. 5 is a flowchart showing the recording process for a packet.

To explain the recording of the packets in step S4 in more detail, as shown in FIG. 5, the control unit 14 first determines whether or not a packet for a new program is to be recorded (step S21). Whether or not a packet for a new program is to be recorded can be determined from the information about the packet that is obtained from the multiplexing circuit 5 as shown in FIG. 2 and from the contents saved in the program-schedule database 18. When recording a new program, the control unit 14 assigns a program ID to that program (step S22), and sets the chapter ID (CID) to '0' (step S23). In step S22 the value resulting from adding 1 to the current program ID is assigned as the program ID for the new program. However, when the value resulting from adding 1 reaches the maximum value for program IDs, it returns to 0. After step S23 is executed, the control unit 14 moves to and executes step S26.

When not recording a packet for a new program, the program ID is kept as is, and the control unit 14 determines whether or not the chapter length CT (packet length) of the packets is greater than the preset maximum chapter time CTmax (step S24). When CT<CTmax, the control unit 14 moves to and executes step S28. On the other hand, when CT+CTmax, the control unit 14 performs a process of dividing up the chapter, and further increases the chapter ID by '1' (step S25), then moves to and executes step S26.

In step S26, in order to update the ending recording sequence number, the control unit 14 increases the number by '1', and sets the chapter time CT to '0'. Also, the control unit 14 creates a new chapter whose end-record-sequence-number EN (step S27). In step S27, the program ID, chapter ID, recording sequence numbers, chapter time, chapter starting address and chapter ending address are set. The program ID is the ID that was set in step S22 when recording a packet for a new program, and is the currently maintained program ID when not recording a packet for a new program. The chapter ID is the ID set in step S23 or S25. The chapter time is '0'. The chapter starting address and chapter ending address are the current recording area ending address. The items set in step S27 are written in the recorded-program database 19 in the database unit 17. They are similarly written in the stream database 20 in the database unit 17. The stream ID and sub-type ID in the stream database 20 are set based on the contents recorded in the program-schedule database. Also, the stream starting address and stream ending address are written according to the addresses where the multiplexed streams are recorded. After executing step 527, the control unit 14 moves to and executes step S28.

In step S28, the control unit 14 instructs the memory apparatus 6 to record the packet. A packet supplied from the multiplexing circuit 5 is written in an area that is the length of the packet starting from the position specified by the recording area ending address of the memory apparatus 6. According to the writing of that packet, the control unit 14 updates the chapter time CT, chapter ending address CEA and recording area ending address REA in the recorded-program database 19 in the database unit 17 (steps S29 to S32). In other words, in step S29, the chapter time CT is set as the value obtained by adding the packet time PT of the written packet to the current chapter time CT, and the chapter ending address CEA is set as the value obtained by adding the packet length PS of the written packet to the current chapter ending address CEA. In step 30, the control unit 14 determines whether or not the value to which that packet length PS is added is greater than the memory capacity SS of the memory apparatus 6, and when PS≧SS, the control unit 14 moves to and executes step S31 and sets the value obtained by subtracting the memory capacity SS from the CEA in step S29 as the chapter ending address CEA. In step S32, the recording area ending address REA is set as the chapter ending address CEA. Also, the stream ending address in the stream database 20 for the stream related to the written packet is updated.

Next, FIG. 6 to FIG. 10 will be used to explain the case in which the packet is recorded over a packet in the memory apparatus 6. FIG. 6 to FIG. 9 show the contents of the recorded-program database 19 at the time T1 to T4, and FIGS. 10A to 10D correspond to times T1 to T4 in FIG. 6 to FIG. 9, and are multiplexed data written in the memory apparatus 6, or in other words, packet strings of stream data. Here, T1<T2<T3<T4. In FIG. 10A to 10D, A0 is a packet corresponding to chapter ID=0 of program A, and A1 is a packet corresponding to chapter ID=1 of program A. This is the same for B0 and B1 of program B, and C0 of program C.

Figure 6:
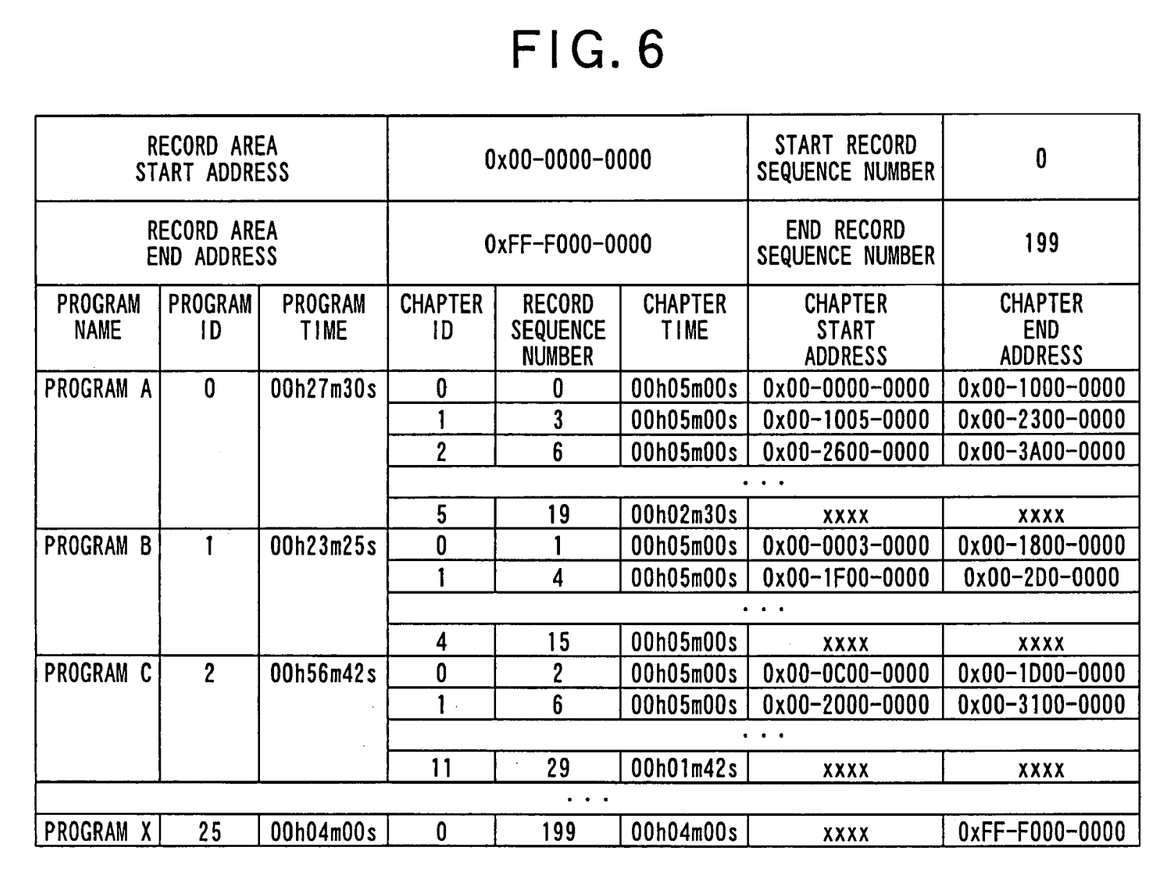
FIG. 6 is a drawing showing the contents of a recorded-program database before recording program Y.

At time T1, a plurality of programs A, B, C, . . . , X are recorded in the memory apparatus 6. As shown in FIG. 6, program A is divided into six chapters, program B is divided into five chapters, program C is divided into twelve chapters and program X is divided into one chapter. The maximum chapter time is set to 5 minutes. Also, the starting recording sequence number is '0', and this corresponds to the chapter 0 of program A. This chapter starting address is the recording area starting address. The ending recording sequence number is 199, and this corresponds to the chapter 0 of program X, and this chapter ending address is the recording area ending address. In other words, the empty recording area (recordable area) V is from 0xFF-F000-0000 (recording ending address) to 0x00-0000-0000 (recording starting address).

Figure 7:
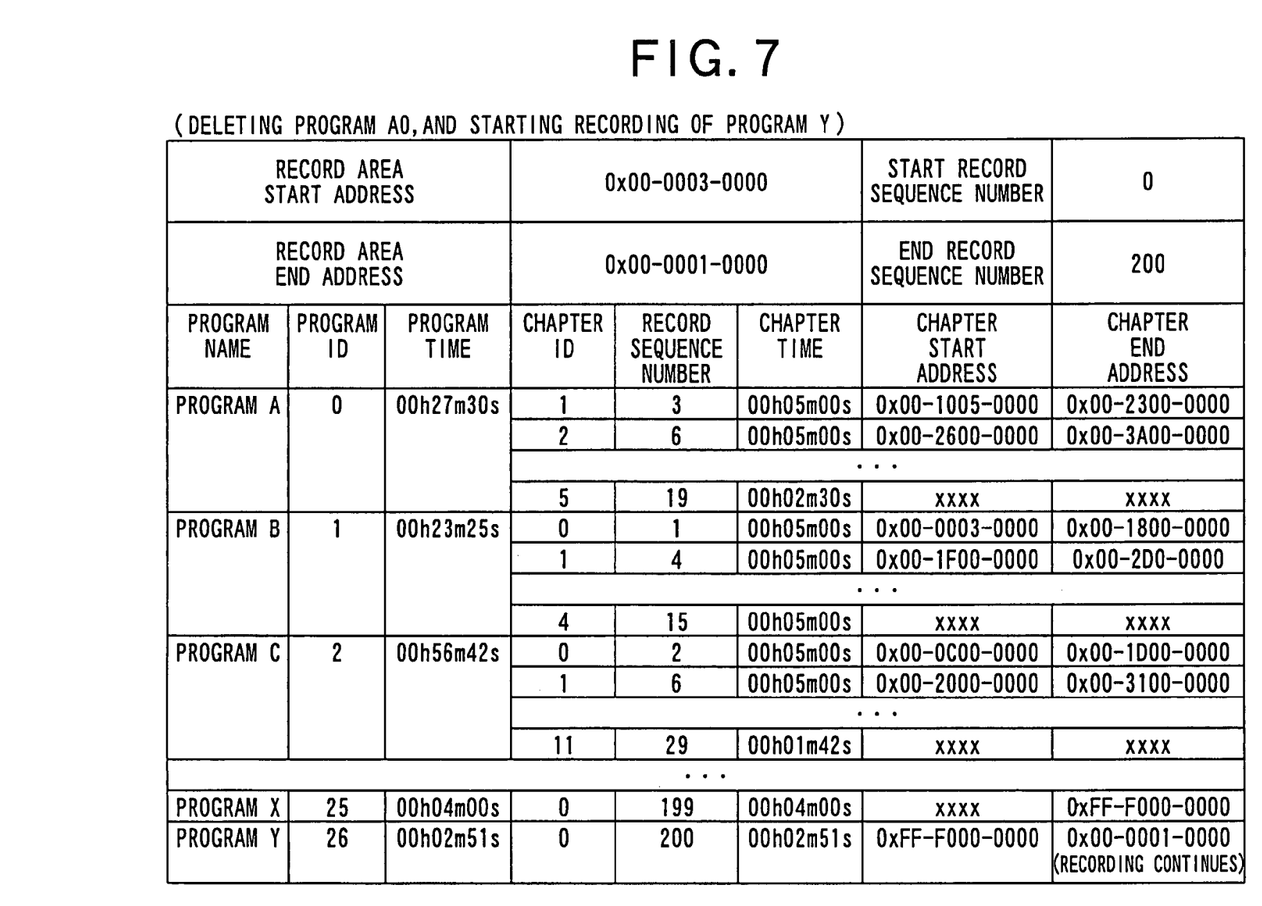
FIG. 7 is a drawing showing the contents of the recorded-program database immediately after recording of program Y has started.

Recording of program Y starts, and at time T2, when the empty memory space of the memory apparatus 6 becomes less than the packet size PS, deletion of an old stream in step S5 is executed. More specifically, by executing step S5, the data (chapter ID, recording sequence number, chapter time, chapter starting address and chapter ending address) for chapter ID=0 of program A whose record-sequence-number is equal to the start-record-sequence number 0 is deleted from the recorded-program database 19. Also, by executing step S12, the starting recording sequence number is set to '1' as shown in FIG. 7. The starting recording sequence number 1 corresponds to chapter ID=0 of program B. This chapter starting address is set to the recording area starting address. In other words, the empty memory area V of the memory apparatus 6 extends up to 0x00-0003-0000 (recording area starting address).

Next, the recorded program Y is registered in the recorded-program database 19. In other words, in step S26, the ending recording sequence number is increased by '1' and becomes 200. The chapter ID of program Y that has this 200 as the recording sequence number is new, so it becomes '0'. Both the chapter starting address and chapter ending address become the current recording area ending address. After that, when the stream data of program Y is recorded up to address 0x00-0001-0000, that address 0x00-0001-0000 is written in the recorded-program database 19 as the chapter ending address for chapter ID=0 of program Y, and as the recording area ending address.

Figure 10A:
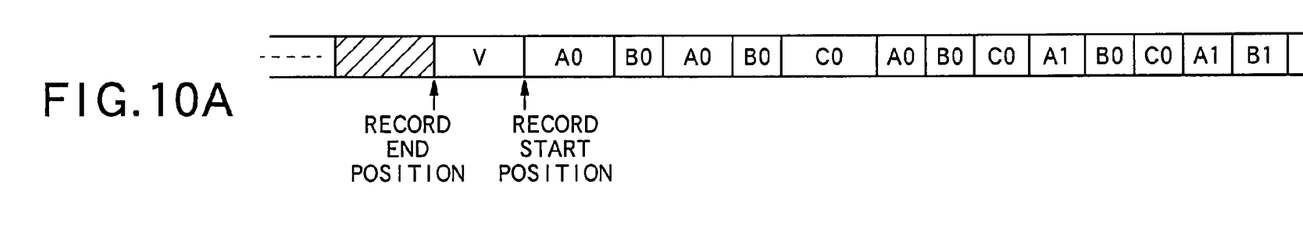
FIGS. 10A, 10D, 10C and 10D are examples of a packet of multiplexed data written in the memory apparatus at the times in FIG. 6 to FIG. 9.
Figure 10B:
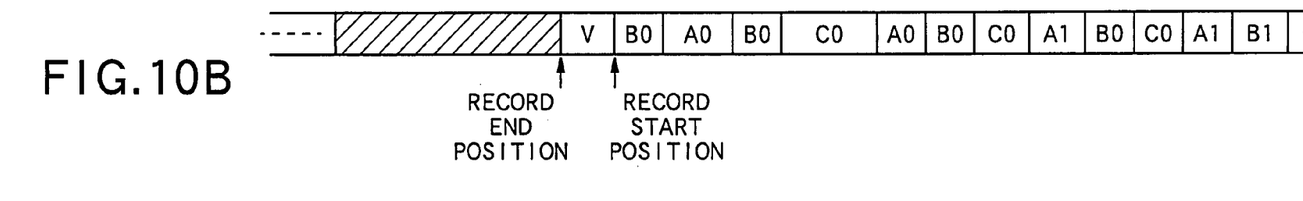

By deleting an old stream in step S5, free recording space V as shown in FIG. 10B, where the packet A0 for chapter ID=0 of program A was recoded, occurs intermittently among the recording area of other streams. However, by setting the maximum chapter time of the chapter to be short, this unavailable empty recoding area is made sufficiently small compared to the memory capacity SS of the memory apparatus 6. Also, as will be described later, by deleting the recording areas of other chapters, the empty recording areas V which was unavalable to record are joined together become a writable area.

Figure 8:
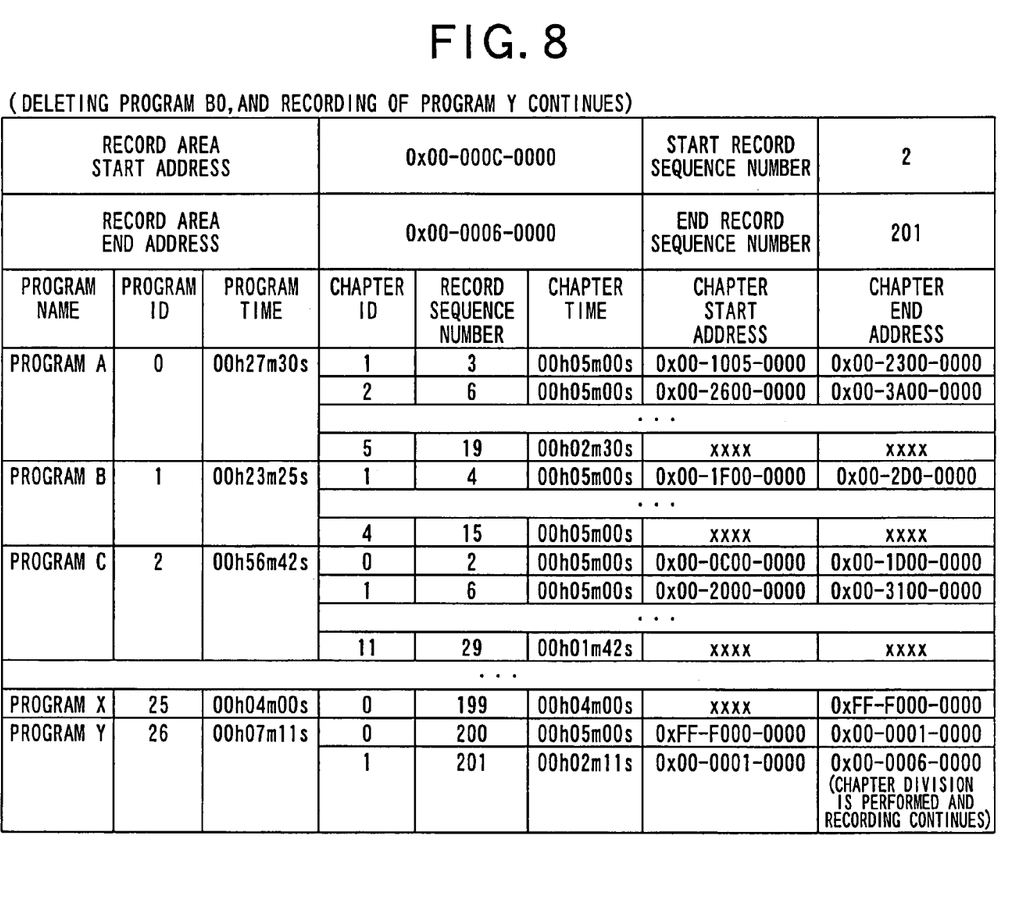
FIG. 8 is a drawing showing the contents of the recorded-program database during recording of program Y.

The recording of program Y continues and at time T3 when it becomes necessary to write over a recording area in order to record further packets, by executing step S5 the data for chapter ID=0 of program B to which a recording sequence number is given that is equal to the starting recording sequence number 1 is deleted from the recorded-program database 19. Also, as shown in FIG. 8, by executing step S12, the starting recording sequence number becomes 2. The starting recording sequence number 2 corresponds to the chapter ID=0 of program C. This chapter starting address is set as the recording area starting address. In other words, the empty memory area of the memory apparatus 6 extends to 0x00-000C-0000 (recording area starting address).

Furthermore, recording of program Y continues and in step S24, when it is determined that the chapter time CT is greater than the maximum chapter time CTmax, the chapter is divided The recording address at this time is written in the recorded-program database 19 as the chapter ending address and recording area ending address for chapter ID=0 of program Y. Also, the chapter time CT at that time is placed in the recorded-program database 19. By doing this, dividing the chapter ends.

After dividing of the chapter ends, the chapter ID of program Y becomes 1. The ending recoding sequence number is increased by 1 in step S26 and becomes 201. The chapter ID of the program Y having 201 as the recording sequence number become chapter ID=1. In step S27, a new chapter is created for chapter ID=1 of program Y, and both the chapter starting address and chapter ending address become the current recording area ending address. After that, when the stream data of program Y has been recorded up to address 0x00-0006-0000, that address 0x00-0006-0000 is written in the recorded-program database 19 as the chapter ending address and the recording area ending address for chapter ID=1 of program Y.

Figure 9:
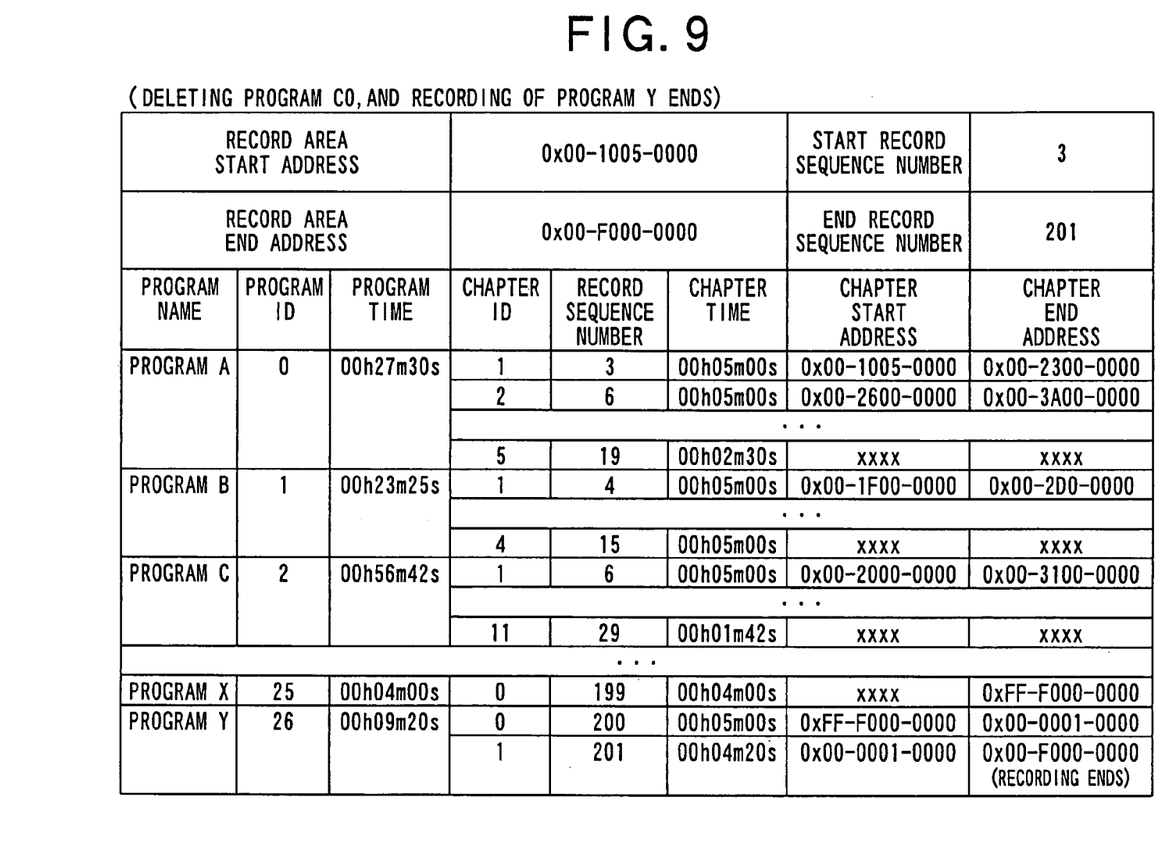
FIG. 9 is a drawing showing the contents of the recorded-program database when recording of program Y is finished.
Figures 10C, 10D:
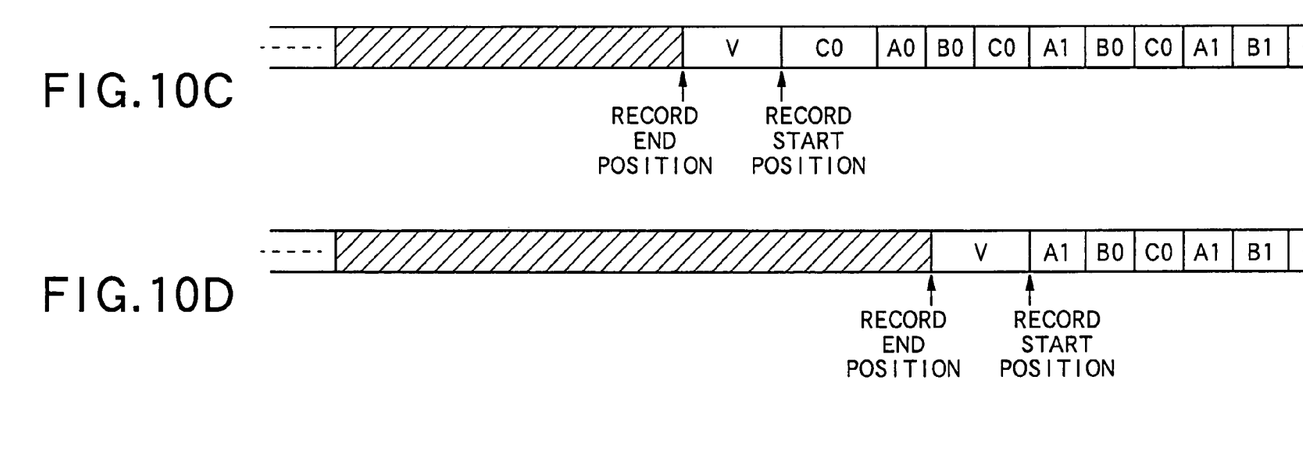

Recording of program Y further continues and at time T4 when the recording area ending address reaches a position as shown in FIG. 10C and it becomes necessary to write over a recording area in order to record further packets, by executing step S5, the data for chapter ID=0 of program C, whose the record-sequence-number equal to the start-record-sequence-number 2, is deleted from the recorded-program database 19. Also, as shown in FIG. 9, by executing step S12 the starting recording sequence number becomes 3. The starting recording sequence number 3 corresponds to chapter ID=1 of program A. This chapter starting address is set as the recording area starting address. In other words, the empty memory space of the memory apparatus 6 extends to 0x00-1005-0000 (recording area starting address).

Similar to as described above, after recording of program Y has been executed, this area becomes the recording area ending address and recording area starting address as shown in FIG. 10D, and recoding is completed at that ending address 0x00-F000-0000. This address is written in the recorded-program database 19 as the chapter ending address and recording-area ending address for chapter ID=1 of program Y.

The packets of program Y are included in the hatched section of FIGS. 10A to 10D.

Figure 11:
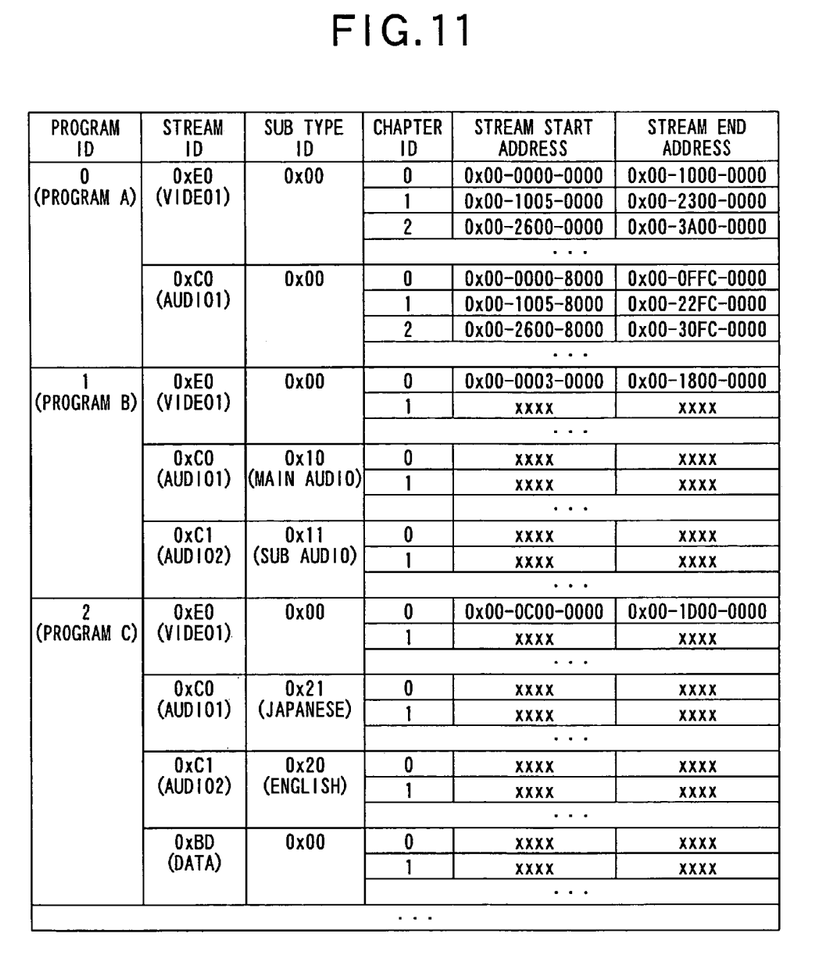
FIG. 11 shows an example of the stream database contents.

FIG. 11 shows an example of the stream database 20 that is formed for programs A, B and C above.

When using a disc drive such as a hard disc drive as the memory apparatus 6, it is possible to reduce the number of times head seeking is performed. In other words, recording to the hard disc drive is performed using a ring buffer method, and the recorded program is recorded in the recorded-program database 19, so even when a packet is recorded over another, it is performed in address order (order of recording position) By recording over other packets, the packets of the oldest programs are deleted. Therefore, it is not necessary to perform head seeking and delete the recorded area of the oldest program, and new packets are recorded over other packets in address order so it is possible to do away with most of the number of times that head seeking is performed. As a result, when recording over older packets, efficient recording in address order is possible.

Moreover, the memory apparatus is not limited to a disc drive, and it is also possible to reduce the number of times the memory is accessed when using a semiconductor memory apparatus, so in the same way, when recording over older packets, efficient recording in address order is possible.

Furthermore, the stream information (video, audio, data) of the program recorded in the memory apparatus 6 is controlled by the stream database 20, and by using the stream database 20, it is possible to know the contents of a program that is recorded in the memory apparatus 6 without having to read and search recorded information from the memory apparatus 6. Also, it is possible to search for a desired program and to immediately access the position where that desired program is recorded.

In the embodiment described above, the maximum chapter time was set to 5 minutes and chapters were divided, however, the chapter time can be set to an arbitrary time. Setting the chapter time to a short amount of time is advantageous in that the amount of wasted empty recording space is reduced, and the unit size for deleting streams is shortened. On the other hand, setting the maximum chapter time to a long amount of time is advantageous in that the number of times the deletion process must be performed is reduced. Dividing chapters can be performed by using changes in video scenes, or content analysis results for the program as dividing units. By doing this, a program can be divided into chapters using meaningful units, and thus suitable searching or deleting of programs becomes possible, as well as it is user friendly. It is also possible to perform deletion in program units without dividing up chapters.

In the embodiment described above, broadcast waves that carry a broadcast program are received by a tuner, however, the recorded broadcast program is not limited to this. For example, it is also possible to receive and record broadcast signals (digital signals or analog signals) that are broadcast by way of a cable from a CATV (cable television) station. Furthermore, it is also possible to receive and record a data signal that is broadcast over a direct line as stream data by way of a line such as the Internet.

As was described above, with this invention, it is desirable that recording is efficiently performed by the recording apparatus even after the storage apparatus reaches its capacity.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2003-121981 filed on Apr. 25, 2003 including the specification, claims, drawings and summary are incorporated herein by reference in its entirety.

What is claimed is:

1. A recording apparatus comprising:
a receiving device which simultaneously receives a plurality of broadcast video signals;
a multiplexing device which obtains a plurality of broadcast video signals from said receiving device, packetizes each of the plurality of broadcast video signals and converts the packets into time-division multiplexed data; and
a control device which records said time-division multiplexed data in a memory apparatus in packet units using a ring buffer method and in the order of recording position, and forms chapter units in said memory apparatus from a specified group of packets for the same program when performing records, wherein
said control device which records a new packet to be recorded over an old packet in order of recording position when the packet length of the packet to be recorded next is greater than the data length of the recordable area from the record-end-position of the newest packet in the recording order to the record-start-position of the oldest packet in the recording order, and take the recorded area of packets whose chapter is equal to the chapter of the old packets to be the recordable area.

2. The recording apparatus according to claim 1, wherein said control device records packets as a new chapter in said memory apparatus when the time length of the chapter of said packets to be recorded next is greater than the maximum chapter time.

3. The recording apparatus according to claim 1, wherein said control device assigns a record sequence number to said chapters that indicates the order of said chapters recorded in said memory apparatus regardless of the program, and saves the relationship between a start record sequence number of the oldest recorded chapter among chapters responding to each packets recorded in said memory apparatus, and a end record sequence number of the newest recorded chapter among them; and
when the packet length of said packet to be recorded next is greater than the data length of the recordable area between said record end position and said record start position, it takes the chapter corresponding to the current start record sequence number to be the oldest chapter of packets, and deletes the data of that chapter from said database unit and updates the start record sequence number of said database unit by increasing it by '1'.

4. The recording apparatus according to claim 3, wherein data for said chapter includes chapter ID (identity), record sequence number, chapter time, chapter start address and chapter end address.

5. The recording apparatus according to claim 3, wherein said control device deletes data for one program from said database unit when data for all of the chapters of one program are deleted by deleting the data for said chapter from said database unit.

6. The recording apparatus according to claim 5, wherein said data of one program includes the program name, program ID and program time.

7. The recording apparatus according to claim 6, wherein said control device creates data for a new program in said database unit when recording packets of a new program, and creates data for chapters of a new program in said database unit.

8. The recording apparatus according to claim 3, wherein said control device stores the record area start address, which indicates said record start position, and the record area end address, which indicates said record end position, in the database unit, and updates said record area end address each time a packet is recorded, and updates said record area start address each time a packet is recorded over.

9. The recording apparatus according to claim 3, wherein said control device records the chapter ID, information start address and information end address in said database unit for each information type of programs recorded as packets in said storage unit.

10. A control method for a recording apparatus comprising a receiving device capable of simultaneously receiving a plurality of broadcast video signals, the control method comprising:
an obtaining process of obtaining a plurality of broadcast video signals from said receiving device, putting each of the plurality of broadcast video signals into packets and converting the packets into time-division multiplexed data;
a first recording process of recording said time-division multiplexed data in a memory apparatus in packet units using a ring buffer method and in the order of recording position, and forming chapter units in said memory apparatus from a specified group of packets for the same program when performing records; and
a second recording process of recording a new packet to be recorded over an old packet in the order of recording position when the packet length of the packet to be recorded next is greater than the data length of the recordable area from the record end position of the newest packet in the recording order to the record start position of the oldest packet in the recording order, and takes the recordable area to be the recorded area of a chapter of packets that is equal to that old chapter of packets.

11. A computer readable medium embodied with a computer program which can be read by a computer in a recording apparatus . . . , the program making the computer function as: a receiving device which simultaneously receives a plurality of broadcast video signals;

a multiplexing device which obtains a plurality of broadcast video signals from said receiving device, putts each of the plurality of broadcast video signals into packets and converts the packets into time-division multiplexed data; and a control device which records said time-division multiplexed data in a memory apparatus in packet units using a ring buffer method and in the order of recording position, and forms chapter units in said memory apparatus from a specified group of packets for the same program when performing records, wherein said control device which records a new packet to be recorded over an old packet in order of recording position when the packet length of the packet to be recorded next is greater than the data length of the recordable area from the record end position of the newest packet in the recording order to the record start position of the oldest packet in the recording order, and takes the recordable area to be the recorded area of a chapter of packets that is equal to that old chapter of packets.

* * * * *